United States Patent
Gröning et al.

(10) Patent No.: US 7,460,022 B2
(45) Date of Patent: Dec. 2, 2008

(54) DEVICE FOR PROTECTING ELECTRIC MOTORS

(75) Inventors: Ingolf Gröning, Lohr am Main (DE); Johannes Schelbert, Rieneck (DE)

(73) Assignee: Bosch Rexroth AG, Stuttgart (DE)

( * ) Notice: Subject to any disclaimer, the term of this patent is extended or adjusted under 35 U.S.C. 154(b) by 266 days.

(21) Appl. No.: 11/375,712

(22) Filed: Mar. 13, 2006

(65) Prior Publication Data

US 2006/0275140 A1 Dec. 7, 2006

(30) Foreign Application Priority Data

Mar. 15, 2005 (DE) .................. 10 2005 012 250

(51) Int. Cl.
G08B 21/00 (2006.01)
G08B 23/00 (2006.01)
H02K 5/10 (2006.01)
H02K 5/12 (2006.01)

(52) U.S. Cl. .............. 340/648; 340/693.6; 310/88

(58) Field of Classification Search ............... 73/35.17; 340/438–462, 648, 693.5–693.7; 324/160–801; 417/321, 410.1, 423.14; 310/88, 89
See application file for complete search history.

(56) References Cited

U.S. PATENT DOCUMENTS

| | | | |
|---|---|---|---|
| 3,978,877 A * | 9/1976 | Cox ................. | 236/12.12 |
| 4,807,354 A * | 2/1989 | Capuano et al. ............... | 29/596 |
| 5,192,194 A * | 3/1993 | Birdwell ..................... | 417/9 |
| 6,366,436 B1* | 4/2002 | Maier et al. ................. | 361/93.9 |
| 7,062,952 B2* | 6/2006 | Gokhfeld ..................... | 73/23.31 |
| 7,098,779 B2* | 8/2006 | Pontius ........................ | 340/439 |
| 2005/0285464 A1* | 12/2005 | Orders et al. .................. | 310/88 |

FOREIGN PATENT DOCUMENTS

| | | |
|---|---|---|
| DE | 69 06 000 | 2/1970 |
| DE | 203 14 330 | 1/2004 |
| DE | 44 18 158 | 3/2004 |
| JP | 05-137289 | 6/1993 |

* cited by examiner

Primary Examiner—George A Bugg
Assistant Examiner—Jennifer Mehmood
(74) Attorney, Agent, or Firm—Kenyon & Kenyon LLP

(57) ABSTRACT

A device for the explosion protection of electric motors or similar electrical devices such as pumps, in which the motor has a protective housing and works together with an interconnected sensor accommodated in a separate protective housing. A favorable construction is achieved in that the motor protection housing and the sensor protection housing are configured for protection classes of different levels, the lower protection class being provided for the motor protection housing, and the higher protection class being provided for the sensor protection housing, and the protective device being provided for the lower protection class.

18 Claims, 1 Drawing Sheet

DEVICE FOR PROTECTING ELECTRIC MOTORS

FIELD OF THE INVENTION

The present invention relates to a device for the explosion protection of electric motors or similar electrical devices such as pumps, in which the motor has a protective housing and works together with an interconnected sensor accommodated in a protective housing.

BACKGROUND INFORMATION

Such electrical devices, particularly motors, must have a protection against explosions for various environments so as to protect persons and objects against damage. According to the DIN standard EN 50014, different protection classes are prescribed for different environments, for example, the low protection class ex-p and the adjoining higher protection class ex-d. The sensor may be used for various purposes, for example, for position information for the motor as such or for the rotor, for regulating the speed of the motor, etc.

The protection class ex-p prescribes that the motor protection housing and the sensor protection housing have to be designed to be only overpressure-resistant, requiring the implementation of suitable purging measures. For this purpose, the overpressure-resistant protective housings must be provided with purge openings to which for the motor protection housing as well as for the sensor protection housing in each case a separate monitored purge circuit having a monitoring device and a purge device is connected.

The protection class ex-d prescribes that the motor protection housing and the sensor protection housing must be designed to be pressure-resistant, the sensor itself having to be designed to be explosion-proof. The protective housings must pressure-resistant to such a degree that, if an ignitable gas mixture explodes in these protective housings, they withstand the explosion in the interior without igniting an ignitable gas mixture outside these protective housings. Purge circuits are not required in this case.

In protection class ex-p two purge circuits having the appropriate devices and an explosion-protected sensor are thus required, whereby substantial costs for protection are incurred. In protection class ex-d, high-quality protective housings and also an explosion-protected sensor are required such that substantial costs also arise for protection.

An objective of the present invention is to provide a protective device, in which a reliable explosion protection is obtained at the lowest possible expense.

SUMMARY OF THE INVENTION

This objective is achieved according to the present invention. In this connection there is a provision for the motor protection housing and the sensor protection housing to be configured for protection classes of various levels, the lower protection class being provided for the motor protection housing and the higher protection class being provided for the sensor protection housing and the protection device being provided for the lower protection class.

As a result, only a relatively inexpensive motor protection housing having only one purge circuit and a pressure-resistant sensor protection housing are required, it being possible to use an inexpensive standard sensor.

Another useful development of the present invention provides for the motor protection housing to be configured to be overpressure-resistant and to be provided with purge holes and for the sensor protection housing to be configured to be pressure-resistant without a purging device.

According to another advantageous development of the present invention, the sensor protection housing is provided with gaps for dissipating an explosion wave.

In accordance with another advantageous development of the present invention, the sensor protection housing having the sensor is located outside on the motor protection housing.

According to an alternative advantageous development of the present invention, the sensor protection housing having the sensor is located inside the motor protection housing.

Another advantageous measure for an inexpensive construction is to use a simple standard sensor as the sensor, which as such has no explosion protection provisions.

Measures for connecting a monitored purging agent circuit having a monitoring device and a purging device to the purge holes contribute to a reliable functioning.

DETAILED DESCRIPTION

Figure 1:
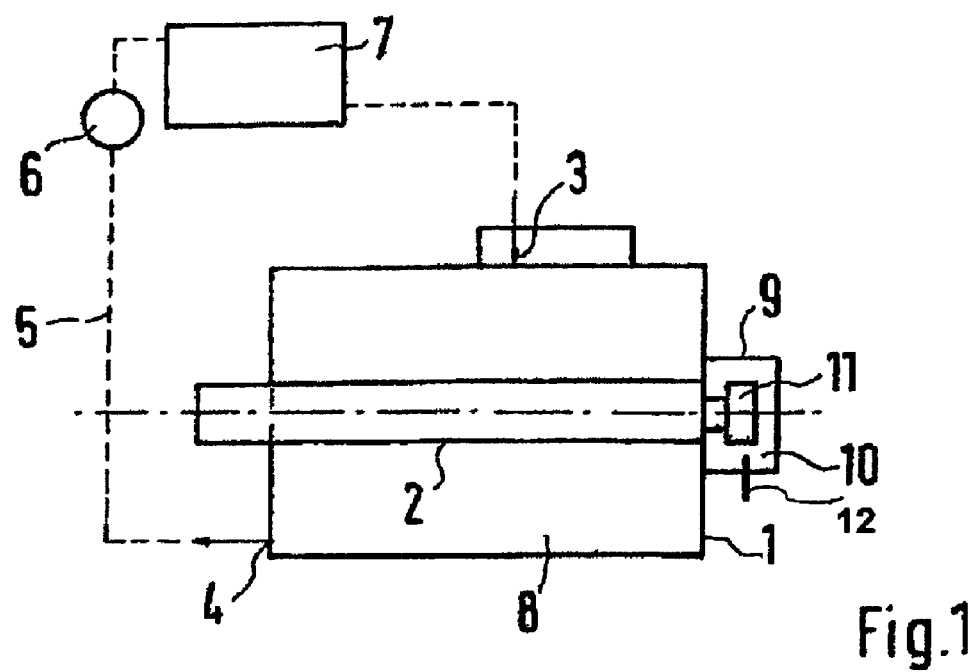
FIG. 1 shows a basic representation of a protection device for an electric motor having a sensor situated on it according to one of the first exemplary embodiments of the present invention.

In FIG. 1, a protective housing 1 for an electric motor 2, which may also be the stator of this motor, is provided with purge holes 3, 4. A purge circuit 5 is connected to these purge holes 3, 4, in which a monitoring device 6 and a purging device 7 are situated. Purging device 7 may include a compressed air source, which conducts compressed air through protective housing 1. Protective housing 1 only has to be pressure-resistant to such a degree that it withstands the compressed air pressure. For this purpose, protective housing 1 does not have to be an elaborate design. Monitoring device 6 measures the temperature of the exhaust air coming from protective housing 1 and regulates the volume of the fresh air supplied to protective housing 1 accordingly. Purging device 7 and monitoring device 6 lie outside of the explosive environment. The purging takes place in the ex-p-encapsulated space 8.

Attached to protective housing 1 or to motor 2 is a sensor protection housing 9 having an ex-d-encapsulated space 10, which is sealed off against ex-p-encapsulated space 8. Sensor protection housing 9 is a small, sturdy housing that is configured to be pressure-resistant. It is provided with known gaps 12. Sensor protection housing 9 and the gap 12 are configured in such a way that sensor protection housing 9 withstands an explosion within space 10, the gap 12 ensuring that the explosion wave dissipates. A sensor 11, which is connected to the motor shaft, is situated inside sensor protection housing 9. Sensor 11 is advantageously a simple and inexpensive standard design, which as such does not have to be designed for the requirements of explosion protection.

Figure 2:
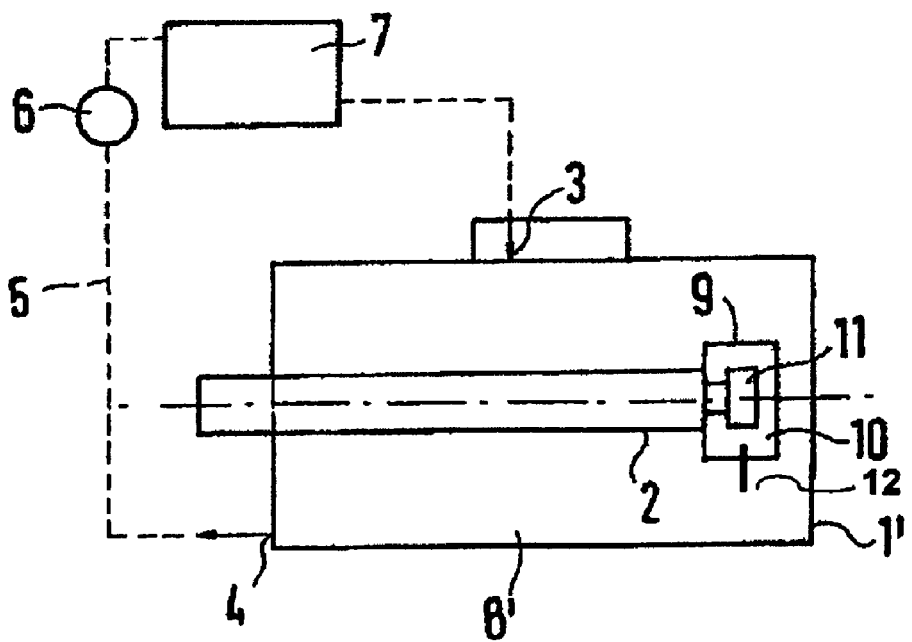
FIG. 2 shows a basic representation of a protection device for an electric motor having a sensor situated on it according to another exemplary embodiment of the present invention.

FIG. 2 shows a second embodiment of the protective device in accordance with the present invention for an electric motor 2. Protective housing 1' having the connected purging circuit is configured similarly as in FIG. 1. Sensor protection housing 9 having sensor 11 is also configured similarly as in FIG. 1. The difference is that sensor protection housing 9 is situated inside of protective housing 1' in the ex-p-encapsulated space 8'.

What is claimed is:

1. A device for an explosion protection of an electric motor, the motor cooperating with an interconnected sensor, the device comprising:
   a motor protection housing accommodating the motor; and
   a separate sensor protection housing accommodating the sensor,
   wherein the motor protection housing and the sensor protection housing are configured for protection classes of different levels, a first protection class being provided for the motor protection housing, and a second protection class being provided for the sensor protection housing, and wherein the first protection class provides a lower protection against explosion occurring within a protection housing than the second protection class.

2. The device according to claim 1, wherein the motor is a pump.

3. The device according to claim 1, wherein the motor protection housing is configured to be superpressure-resistant and is configured with purge holes, and the sensor protection housing is configured without purge holes.

4. The device according to claim 1, wherein the sensor protection housing has gaps for dissipating an explosion wave.

5. The device according to claim 1, wherein the sensor protection housing has the sensor situated outside on a motor protection housing.

6. The device according to claim 1, wherein the sensor protection housing has the sensor situated in an interior of a motor protection housing.

7. The device according to claim 1, wherein the sensor has no explosion protection device.

8. The device according to claim 3, further comprising a monitored purging agent circuit, including a monitoring device and a purging device, connected to the purge holes.

9. The device according to claim 1, wherein the motor is a pump, and wherein the motor protection housing is configured to be superpressure-resistant and is configured with purge holes, and the sensor protection housing is configured without purge holes.

10. The device according to claim 9, wherein the sensor protection housing has the sensor situated outside on a motor protection housing.

11. The device according to claim 9, wherein the sensor protection housing has the sensor situated in an interior of a motor protection housing.

12. The device according to claim 1, wherein the motor is a pump, wherein the motor protection housing is configured to be superpressure-resistant and is configured with purge holes, and the sensor protection housing is configured without purge holes, and wherein the sensor protection housing has gaps for dissipating an explosion wave.

13. The device according to claim 12, wherein the sensor protection housing has the sensor situated outside on a motor protection housing.

14. The device according to claim 12, wherein the sensor protection housing has the sensor situated in an interior of a motor protection housing.

15. The device according to claim 12, wherein the sensor has no explosion protection device.

16. The device according to claim 12, further comprising:
   a monitored purging agent circuit, including a monitoring device and a purging device, connected to the purge holes.

17. The device according to claim 12, wherein the first protection class is an ex-p class under DIN standard EN 50014 and the second protection class is an ex-d class under the DIN standard EN 50014.

18. The device according to claim 1, wherein the first protection class is an ex-p class under DIN standard EN 50014 and the second protection class is an ex-d class under the DIN standard EN 50014.

* * * * *